US008973965B2

(12) United States Patent
Zalan et al.

(10) Patent No.: US 8,973,965 B2
(45) Date of Patent: Mar. 10, 2015

(54) FOLDING AND STOWING REAR-FACING VEHICLE SEAT

(71) Applicants: Daryl Zalan, San Francisco, CA (US); Sohel Merchant, Marina Del Rey, CA (US)

(72) Inventors: Daryl Zalan, San Francisco, CA (US); Sohel Merchant, Marina Del Rey, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 139 days.

(21) Appl. No.: 13/891,508

(22) Filed: May 10, 2013

(65) Prior Publication Data
US 2014/0333086 A1 Nov. 13, 2014

(51) Int. Cl.
B60N 2/01 (2006.01)
B60N 2/04 (2006.01)

(52) U.S. Cl.
CPC ...... B60N 2/04 (2013.01); B60N 2/01 (2013.01)
USPC ............ 296/64; 296/65.01; 297/15; 297/244

(58) Field of Classification Search
USPC ......... 296/64, 65.01, 65.05, 65.09, 65.16, 69; 297/15, 244, 254, 256, 301.1, 301.5, 297/316, 325, 326, 331, 340, 344.1
See application file for complete search history.

(56) References Cited

U.S. PATENT DOCUMENTS

| 2,888,296 | A | * | 5/1959 | Huggins ..................... 296/24.3 |
| 3,632,165 | A | * | 1/1972 | Miller ........................... 297/254 |
| 3,746,389 | A | * | 7/1973 | Fourrey ......................... 297/15 |
| 4,519,646 | A | | 5/1985 | Leitermann et al. |
| 5,454,613 | A | * | 10/1995 | Weber et al. ............... 296/65.17 |
| 5,482,346 | A | * | 1/1996 | Lesourd ........................... 296/66 |
| 5,904,404 | A | | 5/1999 | McCulloch et al. |
| 6,672,662 | B1 | * | 1/2004 | Balk ............................. 297/244 |
| 6,793,265 | B2 | | 9/2004 | Kamida et al. |
| 7,325,874 | B2 | | 2/2008 | Zhang |
| 7,458,635 | B2 | | 12/2008 | Mendis et al. |
| 7,686,367 | B2 | | 3/2010 | Neale |
| 7,806,480 | B2 | | 10/2010 | Wieclawski |
| 8,342,605 | B2 | | 1/2013 | Tanaka et al. |
| 8,348,345 | B2 | | 1/2013 | Muller et al. |
| 8,353,552 | B2 | | 1/2013 | Scheurer, II et al. |
| 8,360,497 | B2 | | 1/2013 | Kokubo et al. |
| 8,376,443 | B2 | | 2/2013 | Kemp et al. |
| 8,398,164 | B2 | | 3/2013 | Baker et al. |
| 8,408,648 | B2 | | 4/2013 | Champ |

OTHER PUBLICATIONS

Chevrolet Tahoe, Suburban Owner Manual, 2009, pp. i-ii and 66-69.

* cited by examiner

Primary Examiner — Glenn Dayoan
Assistant Examiner — Jason S Daniels
(74) Attorney, Agent, or Firm — J. Richard Soderberg

(57) ABSTRACT

A rear-facing seat for a vehicle comprises: a seat portion connected to the vehicle by a hinge so that the rear-facing seat assumes at least a stowed position and an unstowed position; and a back portion connected to the seat portion, wherein in the unstowed position the back portion assumes at least an up position and a down position, wherein in the up position (i) a hook on the back portion engages a first striker on a vehicle wall, and (ii) a latch on the back portion engages a second striker of a back of a forward-facing seat.

20 Claims, 4 Drawing Sheets

FOLDING AND STOWING REAR-FACING VEHICLE SEAT

BACKGROUND

In recent decades, the passenger capacity of vehicles has gained more attention from both customers and car manufacturers. Particularly, the great consumer interest in minivans and sport utility vehicles (SUVs) led to an increased focus on producing vehicles with room for more than five passengers, which is the typical capacity of sedans and larger luxury-level cars. For example, many SUVs offer a third row of seats toward the end of the vehicle, which seats could sometimes be collapsed to make more room for cargo.

SUMMARY

In a first aspect, a rear-facing seat for a vehicle comprises: a seat portion connected to the vehicle by a hinge so that the rear-facing seat assumes at least a stowed position and an unstowed position; and a back portion connected to the seat portion, wherein in the unstowed position the back portion assumes at least an up position and a down position, wherein in the up position (i) a hook on the back portion engages a first striker on a vehicle wall, and (ii) a latch on the back portion engages a second striker of a back of a forward-facing seat.

Implementations can include any or all of the following features. The second striker is a member inside the back of the forward-facing seat, and the latch at least partially enters into the inside of the back of the forward-facing seat to engage the straight member. The latch comprises a single movable part which is a one-piece grip with a contoured hook that in the up position restricts horizontal movement of the back portion. The latch further comprises a fork portion fixed on the back portion, and in the up position the fork portion restricts vertical movement of the back portion. The one-piece grip has at least two contoured hooks parallel to each other, and the latch comprises respective fork portions for each of the contoured hooks. The rear-facing seat is configured in a triangle arrangement in which a connection between the seat portion and the back portion is a first vertex, the latch and the second striker are a second vertex, and a fix point on the forward-facing seat is a third vertex. The back portion comprises a main portion and a hinged head portion on which the latch is mounted, and the hinged head portion is configured to fold, in the down position, so that the latch engages a third striker on the main portion. The rear-facing seat further comprises a five-point harness that is mounted entirely on the rear-facing seat and not on the vehicle wall or the forward-facing seat. The vehicle has a well adjacent the hinge of the seat portion, and the rear-facing seat is entirely contained within the well in the stowed position. The rear-facing seat is configured to seat two people.

In a second aspect, a rear-facing seat for a vehicle comprises: a seat portion connected to the vehicle by a hinge so that the rear-facing seat assumes at least a stowed position and an unstowed position; and a back portion connected to the seat portion, wherein in the unstowed position the back portion assumes at least an up position and a down position, wherein the back portion comprises first means for attaching the rear-facing seat to a vehicle wall in the up position, and second means for attaching the rear-facing seat to a back of a forward-facing seat in the up position.

Implementations can include any or all of the following features. The second means comprises a member inside the back of the forward-facing seat, and a latch that at least partially enters into the inside of the back of the forward-facing seat to engage the straight member. The second means comprises a single movable part which is a one-piece grip with a contoured hook that in the up position restricts horizontal movement of the back portion. The second means further comprises a fork portion fixed on the back portion, and in the up position the fork portion restricts vertical movement of the back portion. The one-piece grip has at least two contoured hooks parallel to each other, and the latch comprises respective fork portions for each of the contoured hooks. The rear-facing seat is configured in a triangle arrangement wherein a connection between the seat portion and the back portion is a first vertex, the second means is a second vertex, and a fix point on the forward-facing seat is a third vertex. The back portion comprises a main portion and a hinged head portion on which the second means is mounted, and the hinged head portion is configured to fold, in the down position, so that the second means attaches the hinged head portion to the main portion. The rear-facing seat further comprises a five-point harness that is mounted entirely on the rear-facing seat and not on the vehicle wall or the forward-facing seat. The vehicle has a well adjacent the hinge of the seat portion, and the rear-facing seat is entirely contained within the well in the stowed position.

In a third aspect, a vehicle comprises: at least one forward-facing seat; and a rear-facing seat comprising: a seat portion connected to the vehicle by a hinge so that the rear-facing seat assumes at least a stowed position and an unstowed position; and a back portion connected to the seat portion, wherein in the unstowed position the back portion assumes at least an up position and a down position, wherein in the up position (i) a hook on the back portion engages a first striker on a vehicle wall, and (ii) a latch on the back portion engages a second striker of a back of the forward-facing seat.

DETAILED DESCRIPTION

This document describes apparatus and techniques relating to a rear-facing vehicle seat that has a sturdy construction yet is easy to fold and stow away when not in use. In some implementations, the rear-facing seat is configured to serve as a third row of seats that make use of the back of the second-row seats for support, and that can be entirely stowed inside a well in the vehicle floor to allow more storage space for cargo. For example, the rear-facing seat can have a trifold design that facilitates compact storage while providing a five-point harness that is attached only to the seat itself (i.e., not attached to an interior wall or other structure in the vehicle.

Figure 1A:
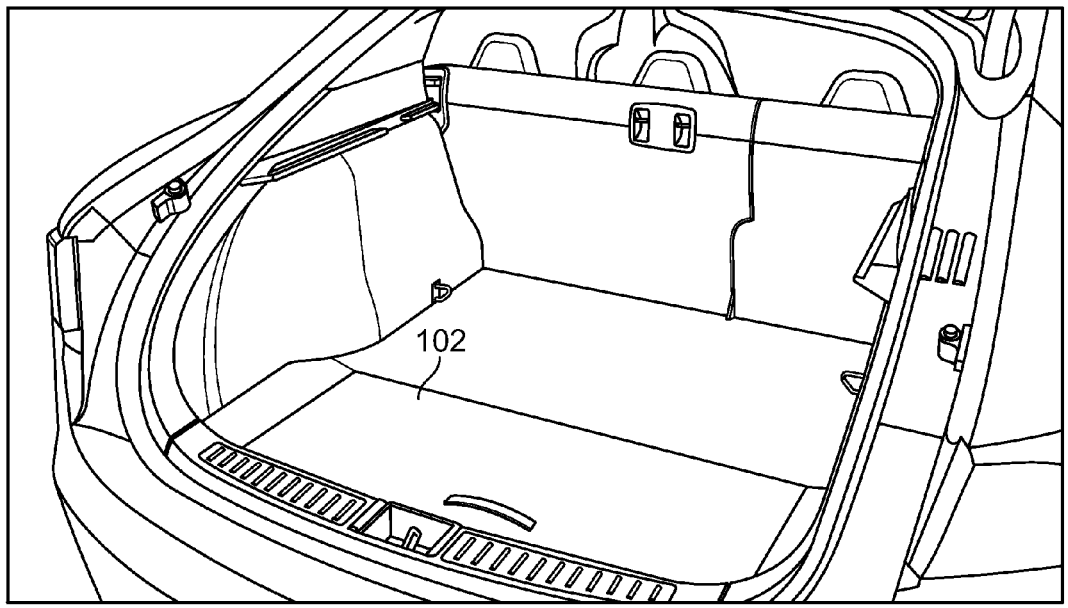
FIGS. 1A-E show examples of a rear-facing seat being unfolded from a stowed position.

FIGS. 1A-E show examples of a rear-facing seat 100 being unfolded from a stowed position. In FIG. 1A, the folded seat is hidden from view by a panel 102. For example, the panel can be made from any material that provides sufficient strength (e.g., against the weight of items placed on top of the panel) and can be coated with fabric or other material similar to the rest of the interior in the vehicle's cargo space. The vehicle is shown with its rear hatch open, which may be the easiest way for a person to access the trunk when unfolding or folding the seat. In some implementations, the seat may also or instead be folded/unfolded by a person inside the vehicle.

Figure 1B:
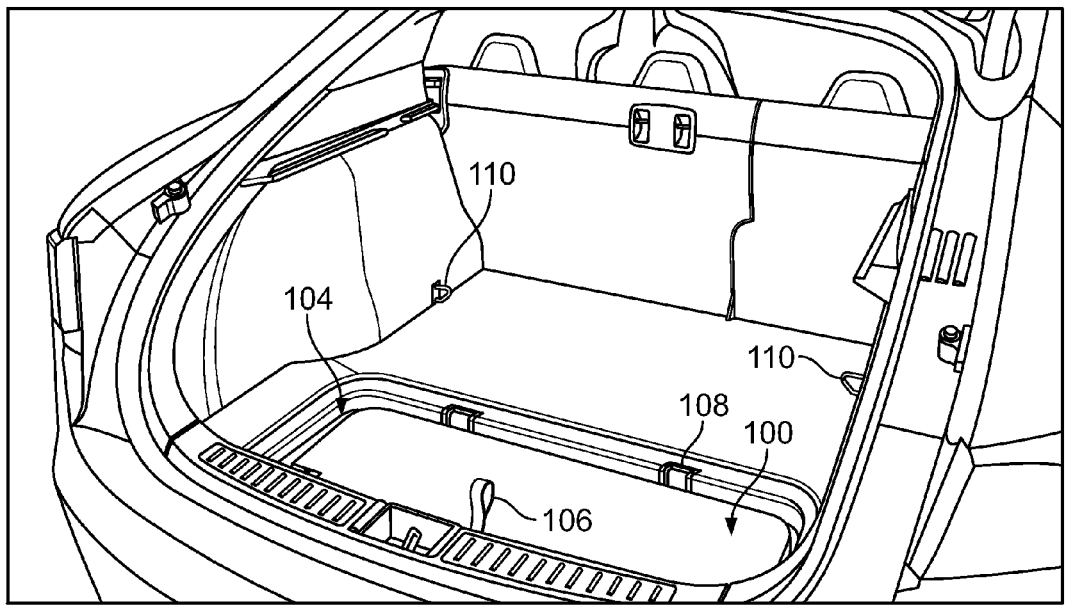

In FIG. 1B, the panel has been removed and the seat 100 is partially visible. The seat is currently located inside a well 104 that is formed in the floor of the vehicle's cargo space. For example, a belt loop 106 or other type of handle can be provided on the seat for lifting or raising the seat from the well. One or more hinges 108 can attach the seat to the vehicle, for example so that the seat can be easily moved between a stowed position (e.g., inside the well) and an unstowed position (e.g., outside the well). In the cargo space, one or more strikers 110 can be provided that will be used in securing the seat when unfolded.

Figure 1C:
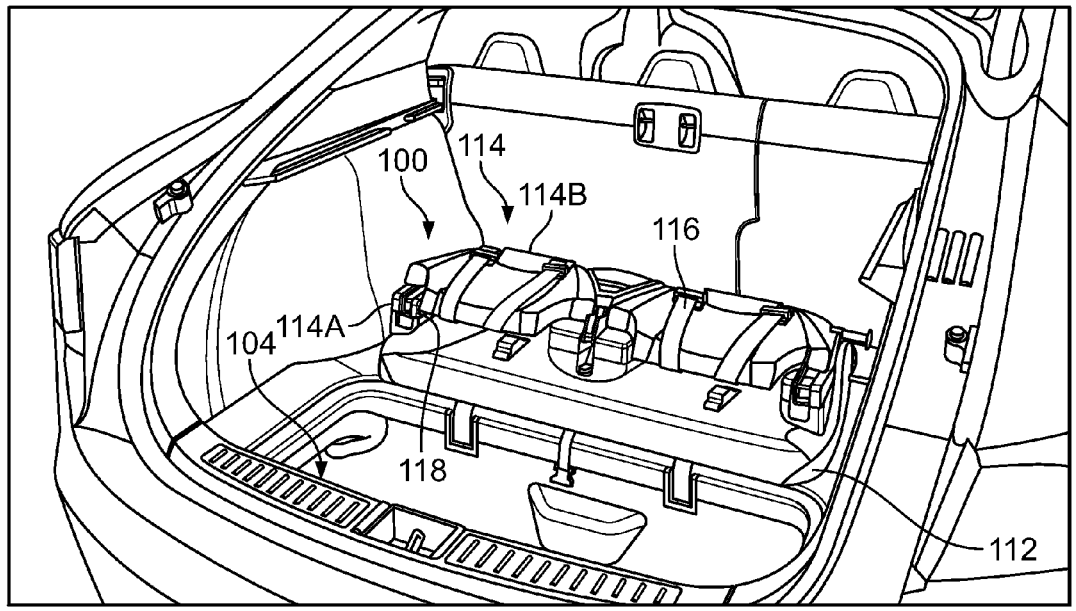

FIG. 1C shows the seat 100 in an unstowed position. That is, the seat has been removed from the well 104 but has not yet been fully unfolded. In the current implementation, the seat comprises a seat portion 112 and at least one back portion 114. For example, the back portion can comprise a main portion 114A and a head portion 114B. On the head portion, one or more seat belts 116 can be fastened.

The main portion 114A can be hinged to the seat portion 112. For example, this can allow the back portion 114 to assume a down position (e.g., as currently shown) or an up position. The head portion can be hinged to the main portion by at least one hinge 118.

Figure 1D:
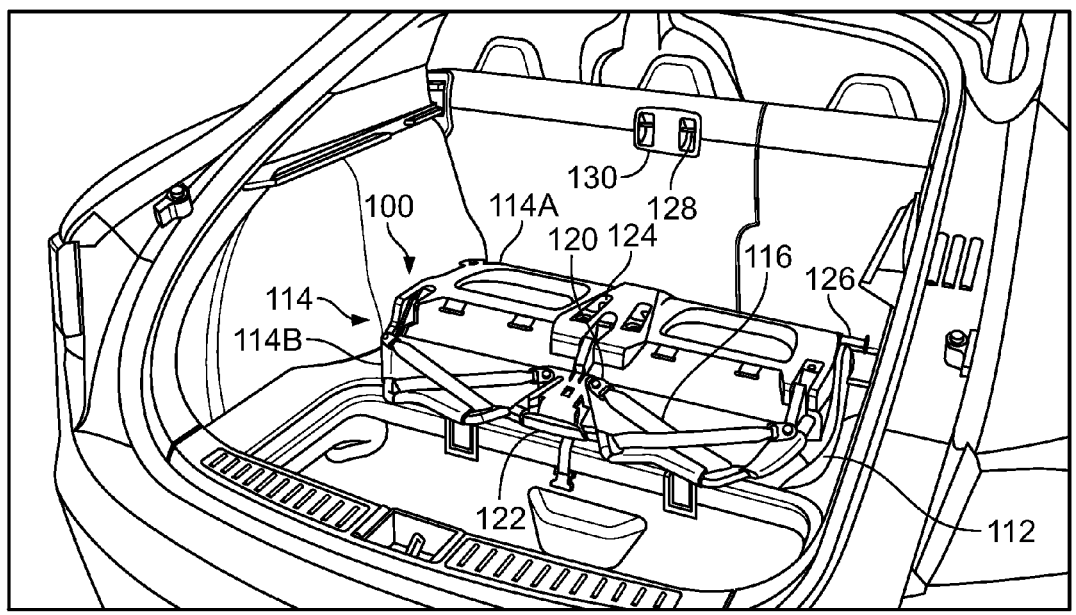

FIG. 1D shows the seat 100 when the head portion 114B has been unfolded and is now extending toward the rear of the vehicle. The seat belts 116 are attached to anchor points 120 on the back of the head portion, and cross each other before running through openings leading to the front of the head portion (currently obscured).

The back portion 114 has at least one handle 122. When the head portion 114B is folded against the main portion 114A, a latch connected to the handle can engage at least one striker 124 that is embedded in the main portion. For example, this can ensure that the two portions are securely held together while the seat is being folded or unfolded.

The back portion 114 has at least one hook 126. With reference again briefly also to FIG. 1B, the hook 126 can be configured so that it securely engages with the striker 110 when the back portion is brought to the up position. For example, the hook can be mounted toward the bottom of the main portion 114A so that the engagement with the striker occurs when the back portion is pivoted about the hinge that connects it to the seat portion 112.

The trunk area where the seat 100 is located is bounded, toward the rear of the vehicle, by interior walls and the hatch lid (when closed). In a forward direction, the trunk area is delimited by the back of the second row of passenger seats. For example, the rear seat here consists of two separate back parts so that the rear seat can be split, such as in a 60/40 configuration.

On the back of the second-row seats is provided at least one striker 128 that is configured to be engaged by the latch of the handle 122. In some implementations, the striker can be internal to the seatback of the second-row seat, such as a straight metal member. For example, the striker can be formed from one or more rods that also serve as structural support in the second-row seatback. In other implementations, one or more metal rods can be added to the inside seatback structure, such as by welding, to serve as striker(s).

The seatback can have one or more reinforcements 130 for the opening(s) where the latch at least partially enters into the inside of the back of the second-row seatback to engage the striker. For example the reinforcement(s) can provide one or more mounting holes to fix the latch and adjust the striker for tolerances. In another implementation, adjustment can be made in the latch on the rear-facing seat.

Figure 1E:
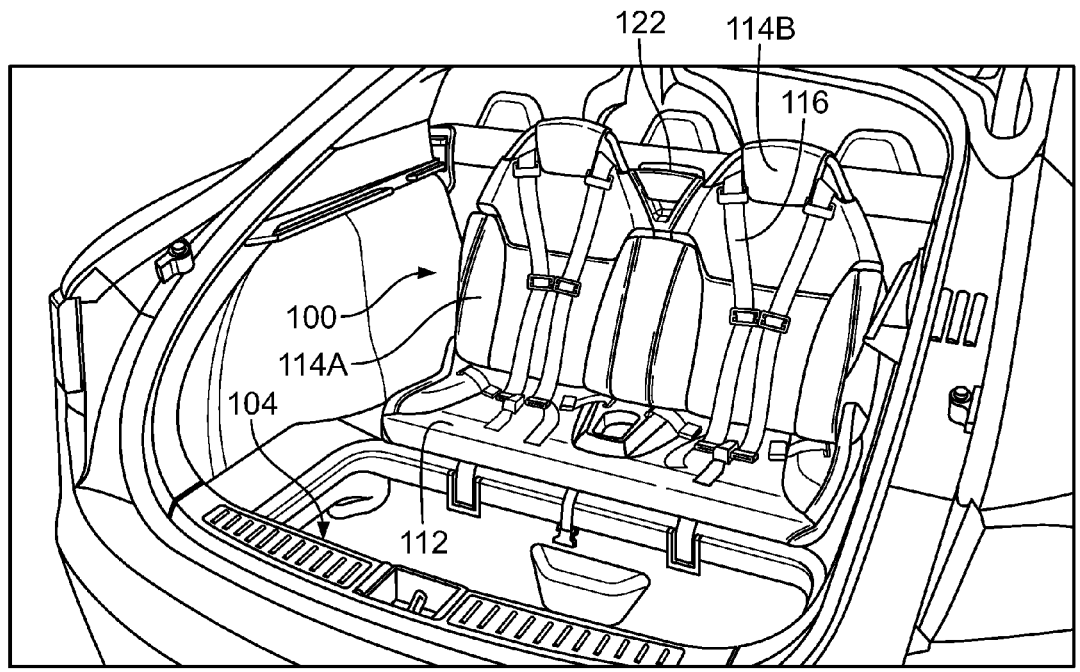

FIG. 1E shows the seat 100 in an unfolded position where the back portion 114 has been pivoted to its up position. The main portion 114A and the head portion 114B are now facing forward and the seat belts 116 are ready to use. That is, a passenger can now sit in the seat, supported by the seat portion 112 and the back portion 114. For example, the passenger can extend his or her legs partially into the well 104 if necessary. In short, the rear-facing seat in this example latches to the back of the second-row seat for added rigidity, automatically latches to strikers on the vehicle body (e.g., on interior walls), and features an integrated five point harness that stows with the seat.

In this implementation, the back portion has two latching elements on the back portion 114 that are both coupled to the handle 122. For example, the back portion can be provided with two (coupled or uncoupled) latching elements when an existing structure inside the back of the second-row seat (e.g., an isofix for tethering a child seat to the second-row seat) makes it difficult or impossible to centrally place the striker for a single latch. Another implementation can have more latches than two, or a single latch.

In the implementation illustrated here, the seat 100 can hold a maximum of two passengers. In other implementations, a rear-facing seat can be designed for only a single person, or for three or more people.

Figure 2:
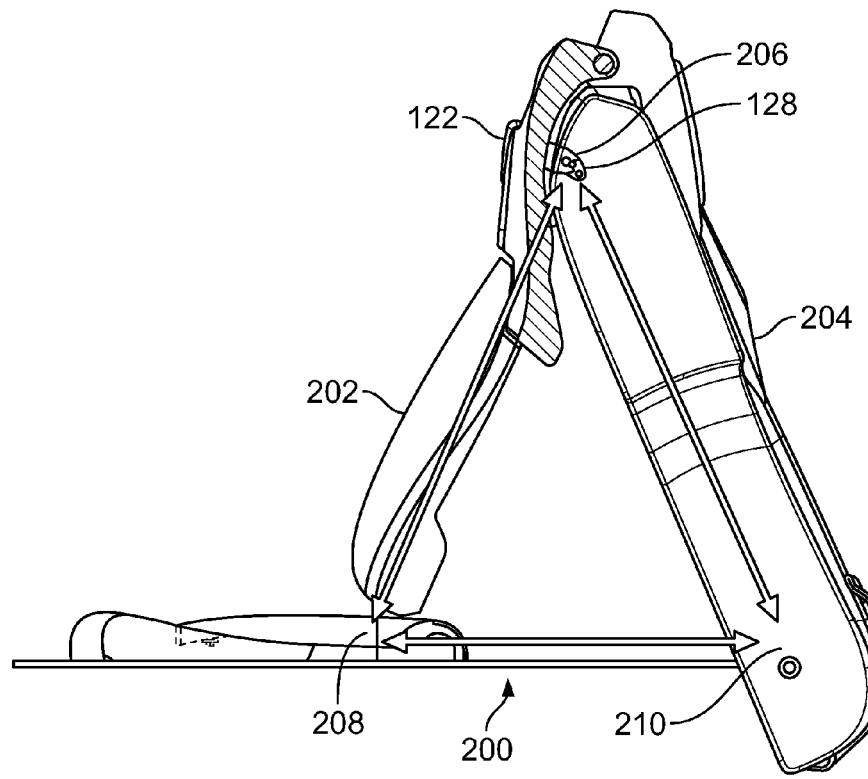
FIG. 2 shows an example of a triangular arrangement of a rear-facing seat and a back of a forward-facing seat.

FIG. 2 shows an example of a triangular arrangement 200 of a rear-facing seat 202 and a back 204 of a forward-facing seat. For example, the forward-facing seat can be the second row of seats in the vehicle. The rear-facing seat and the forward-facing seat are here illustrated in a side view, and for clarity only a portion of the forward-facing seat is visible.

A partial cross section here indicates that a latch 206 connected to the handle 122 is about to engage with the striker 128. When firmly engaged, this latch-striker connection forms one vertex of a triangle, wherein another vertex 208 is formed by the hook-striker engagement between the back portion and the interior wall (e.g., striker 110 in FIG. 1B engaged by hook 126 in FIG. 1D). A third vertex 210 is formed by a fix point on the forward-facing seat. For example, the third vertex can be a pivot point in the second-row seat where a second-row seatback pivots as part of stowing the second-row seat to create a flat cargo space in the vehicle.

This structural arrangement can provide security or durability advantages. In some implementations, the high loads that typically occur in a vehicle crash can be effectively triangulated, as schematically illustrated by arrows in the figure. For example, this arrangement can serve to strengthen both the forward-facing seat (e.g., the second-row seat) and the rear-facing seat (e.g., a third-row seat). Another advantage can be that bulky structure and complicated or expensive latches and hinges within the rear-facing seat can be reduced or eliminated.

Another advantage can be that the third-row seats are more easily accessible from the second-row seats. For example, in an emergency situation a person in the second-row seat can unlatch the rear-facing seat using the handle 122, fold down the second-row seat, fold down the head portion of the rear-facing seat, and then attend to or help the passenger(s) in the rear-facing seats.

Figure 3:
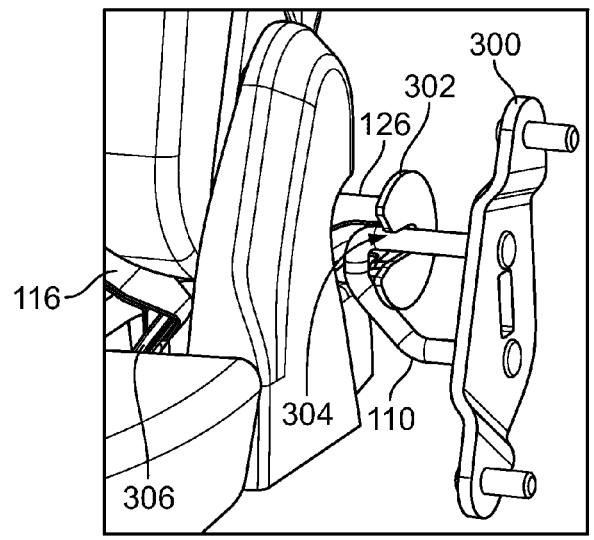
FIG. 3 shows an example of the hook of the rear-facing seat in FIGS. 1A-E and the striker to be mounted on the wall.

FIG. 3 shows an example of the hook 126 of the rear-facing seat in FIGS. 1A-E and the striker 110 to be mounted on the wall. The striker has a base 300 that is designed for being attached to the interior wall of the vehicle. For example, the striker and the base can be made of metal and can be secured to the wall by bolts of sufficient strength given the potential load forces that the striker can be subjected to in a crash. For clarity, the base is here shown without the adjacent vehicle wall.

The hook 126 here includes a disc 302 at its end that has a mouth 304 facing toward the striker 126. That is, when the hook is fully engaged with the striker, the striker is located inside the mouth to restrict movement by the rear-facing seat. For example, such engagement can involve pivoting the back portion from a down position (e.g., as in FIG. 1D) to an up position (e.g., as in FIG. 1E). The hook is offset from the hinge that connects the back portion to the seat portion, so when the back portion is pivoted, the hook too is pivoted until it engages the striker. For example, the hook-striker connection restricts the rear-facing seat from moving vertically. Here, the mouth has a lead-in (e.g., a contoured edge) towards its opening that guides the insertion of the striker.

Also, the seat belt 116 is secured to the rear-facing seat by an anchor 306 on the seat portion. That is, the seat belt is attached only to the rear-facing seat and not to other structures in the vehicle. For example, in the case of a five-point harness, there can be two anchor points on the back of the head portion (e.g., as in FIG. 1D), two anchor points on the seat portion (e.g., the anchor 306 and a corresponding one on the other side of the seat portion), and one anchor point toward the front of the seat portion (e.g., visible in FIG. 1E). After a passenger enters the seat, some or all of the sections of the seat belt can be attached to each other using buckles or other fastening mechanisms suitable for safety belts.

The use of the hook 126 and the striker 110 can have advantages in situations where the rear-facing seat is subjected to strong forces, such as during a crash. In a forward crash where the rear-facing seat is thrust forward, the mouth 304 allows the hook to separate from the striker in the forward direction. For example, this can allow the rear-facing seat to travel a small distance and thereby absorb more energy from the passenger than if the seat were rigidly attached to the striker.

On the other hand, in a rear crash where the rear-facing seat is thrust towards the rear of the vehicle, the hook 126 is secured to the striker and prevents rearward movement of the seat. Thereby, the seat belt (which is anchored solely on the rear-facing seat) can properly restrain the passenger and absorb the crash forces.

Figure 4A:
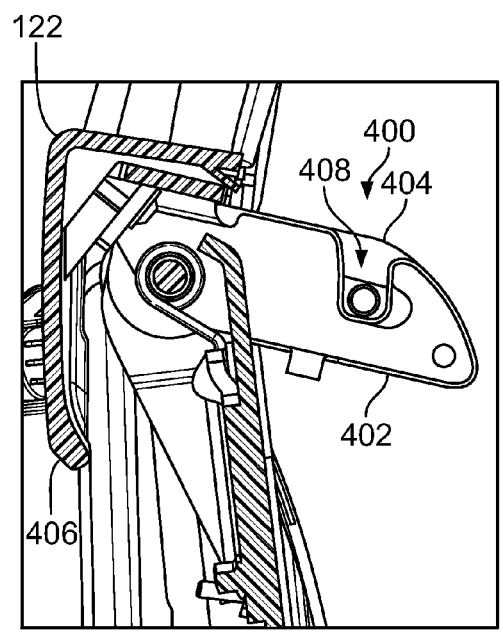
FIGS. 4A-B show an example cross section of a latch on the rear-facing seat in FIGS. 1A-E.
Figure 4B:
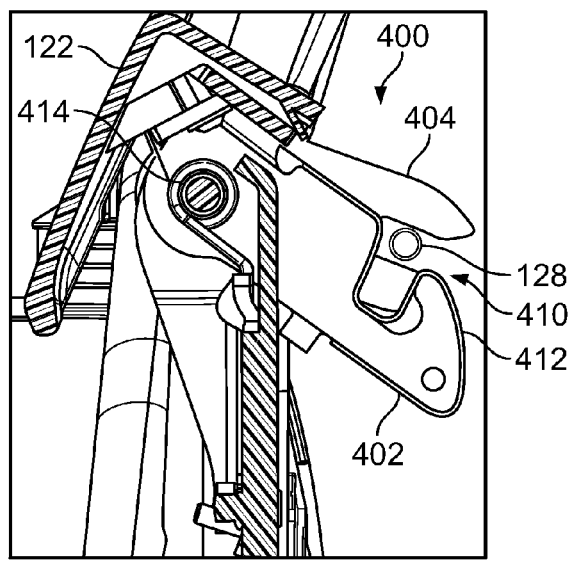

FIGS. 4A-B show an example cross section of a latch 400 on the rear-facing seat in FIGS. 1A-E. FIG. 4A shows the latch in an engaged (closed) position, and FIG. 4B shows the latch as it is engaging (or disengaging) the striker 128.

The latch comprises a contoured hook 402 and a fork portion 404, and can be manufactured from metal, for example. The contoured hook is rigidly connected to the handle 122, When a person actuates the handle—for example by lifting on a lip 406—the handle and the contoured hook pivot about an axis, such as illustrated in FIG. 4B. The handle and contoured hook can be biased (e.g., by a spring) so that their normal position at rest is essentially the one shown in FIG. 4A, both when the latch is engaged with the striker and otherwise. That is, the person lifting the lip 406 applies enough force to overcome the rotational bias and cause the handle-hook to pivot.

The contoured hook has a mouth 408 that is oriented in a generally vertical direction when the back portion is in the up position (e.g., when the rear-facing seat is in use). The hook engages the striker 128 with the mouth and thereby restricts horizontal movement of the rear-facing seat.

The fork portion 404 has a mouth 410 that is oriented in a generally horizontal direction when the back portion is in the up position. The fork engages the striker 128 with the mouth and thereby restricts vertical movement of the rear-facing seat.

The bias of the handle 122 and the contoured hook 402 normally serves to maintain the mouths 408 and 410 in a closed configuration around the striker 128, thereby restricting dislocation of the latch from the striker. That is, the biased handle-hook locks the rear-facing seat to the back of the forward-facing seat, and this lock can be opened by actuating the handle upward.

The contoured hook 402 has a contour edge 412 that is designed to engage the striker 128 while the latch is being closed. The contour edge can be designed to have a substantially constant attack angle on the striker as it engages. That is, when the back portion of the rear-facing seat is being pivoted to its up position, the contoured hook is being moved toward the back of the forward-facing seat. When the contoured hook meets the striker, the contour edge will cause the contoured hook to be rotated towards its open position (e.g., as if someone had lifted the handle) about an axis 414. As shown in FIG. 4B, this moves the contoured hook away from the fork portion 404, thereby exposing the mouth 410 of the fork portion 404. As the latch moves further toward the striker, the striker will enter the mouth 410 of the fork portion. Assuming that the latch is pushed into complete engagement, the contour edge will ultimately cease to engage the striker and the contoured hook will resume its normal position (e.g., as shown in FIG. 4A) by rotating about the axis in the opposite direction. The striker is then trapped by the fork portion and the contoured portion.

Folding the rear-facing seat and stowing it can be performed in essentially the reverse order. First, a person can lift and pull on the handle 122 (e.g., when the seat is in the up position as shown in FIG. 1E). This moves the contoured hook away from the fork portion and allows the latch to escape the striker. The back portion can then be pivoted to its down position (e.g., the position shown in FIG. 1D). Next, the head portion can be folded so that it sits on top of the main portion (e.g., as it does in FIG. 1C). In some implementations, the person releases a locking mechanism to allow this movement. For example, such a lock can restrict the head portion from accidentally folding while the seat is in use.

In some implementations, a belt or other fastener is applied around the folded seat in the FIG. 1C position to prevent it from accidentally unfolding. The folded seat can then be stowed in the well (e.g., as shown in FIG. 1B) and the panel can be placed on top of the well (e.g., as shown in FIG. 1A). As another example, the back portion 114 (e.g., the main portion 114A thereof) could latch to the seat portion 112, which can prevent the seat from accidentally unfolding (e.g., this can also require the head portion 114B to be latched to the main portion).

The latches and/or hooks described herein can be used for one or more other purposes. In some implementations, cargo can be secured. For example, a cargo net can be attached to the strikers 110 (and/or to the striker 128) and extend to other fasteners (not shown) at the rear of the trunk space.

A number of examples have been described. Nevertheless, other implementations are also covered by the following claims.

What is claimed is:
1. A rear-facing seat for a vehicle comprising:
a seat portion connected to the vehicle by a hinge so that the rear-facing seat assumes at least a stowed position and an unstowed position; and
a back portion connected to the seat portion, wherein in the unstowed position the back portion assumes at least an up position and a down position, wherein in the up position (i) a hook on the back portion engages a first striker on a vehicle wall, and (ii) a latch on the back portion engages a second striker of a back of a forward-facing seat.

2. The rear-facing seat of claim 1, wherein the second striker is a straight member inside the back of the forward-facing seat, and wherein the latch at least partially enters into the inside of the back of the forward-facing seat to engage the straight member.

3. The rear-facing seat of claim 1, wherein the latch comprises a single movable part which is a one-piece grip with a contoured hook that in the up position restricts horizontal movement of the back portion.

4. The rear-facing seat of claim 3, wherein the latch further comprises a fork portion fixed on the back portion, and wherein in the up position the fork portion restricts vertical movement of the back portion.

5. The rear-facing seat of claim 4, wherein the one-piece grip has at least two contoured hooks parallel to each other, and wherein the latch comprises respective fork portions for each of the contoured hooks.

6. The rear-facing seat of claim 1, configured in a triangle arrangement in which a connection between the seat portion and the back portion is a first vertex, the latch and the second striker are a second vertex, and a fix point on the forward-facing seat is a third vertex.

7. The rear-facing seat of claim 1, wherein the back portion comprises a main portion and a hinged head portion on which the latch is mounted, and wherein the hinged head portion is configured to fold, in the down position, so that the latch engages a third striker on the main portion.

8. The rear-facing seat of claim 1, further comprising a five-point harness that is mounted entirely on the rear-facing seat and not on the vehicle wall or the forward-facing seat.

9. The rear-facing seat of claim 1, wherein the vehicle has a well adjacent the hinge of the seat portion, and wherein the rear-facing seat is entirely contained within the well in the stowed position.

10. The rear-facing seat of claim 1, configured to seat two people.

11. A rear-facing seat for a vehicle comprising:
a seat portion connected to the vehicle by a hinge so that the rear-facing seat assumes at least a stowed position and an unstowed position; and
a back portion connected to the seat portion, wherein in the unstowed position the back portion assumes at least an up position and a down position, wherein the back portion comprises first means for attaching the rear-facing seat to a vehicle wall in the up position, and second means for attaching the rear-facing seat to a back of a forward-facing seat in the up position.

12. The rear-facing seat of claim 11, wherein the second means comprises a straight member inside the back of the forward-facing seat, and a latch that at least partially enters into the inside of the back of the forward-facing seat to engage the straight member.

13. The rear-facing seat of claim 11, wherein the second means comprises a single movable part which is a one-piece grip with a contoured hook that in the up position restricts horizontal movement of the back portion.

14. The rear-facing seat of claim 13, wherein the second means further comprises a fork portion fixed on the back portion, and wherein in the up position the fork portion restricts vertical movement of the back portion.

15. The rear-facing seat of claim 14, wherein the one-piece grip has at least two contoured hooks parallel to each other, and wherein the second means comprises respective fork portions for each of the contoured hooks.

16. The rear-facing seat of claim 11, configured in a triangle arrangement wherein a connection between the seat portion and the back portion is a first vertex, the second means is a second vertex, and a fix point on the forward-facing seat is a third vertex.

17. The rear-facing seat of claim 11, wherein the back portion comprises a main portion and a hinged head portion on which the second means is mounted, and wherein the hinged head portion is configured to fold, in the down position, so that the second means attaches the hinged head portion to the main portion.

18. The rear-facing seat of claim 11, further comprising a five-point harness that is mounted entirely on the rear-facing seat and not on the vehicle wall or the forward-facing seat.

19. The rear-facing seat of claim 11, wherein the vehicle has a well adjacent the hinge of the seat portion, and wherein the rear-facing seat is entirely contained within the well in the stowed position.

20. A vehicle comprising:
at least one forward-facing seat; and
a rear-facing seat comprising:
a seat portion connected to the vehicle by a hinge so that the rear-facing seat assumes at least a stowed position and an unstowed position; and
a back portion connected to the seat portion, wherein in the unstowed position the back portion assumes at least an up position and a down position, wherein in the up position (i) a hook on the back portion engages a first striker on a vehicle wall, and (ii) a latch on the back portion engages a second striker of a back of the forward-facing seat.

* * * * *